United States Patent

Steen et al.

[11] Patent Number: 5,941,790
[45] Date of Patent: Aug. 24, 1999

[54] DRIVE AXLE ASSEMBLY

[76] Inventors: Carson D. Steen; Robby W. Steen, both of 402 Tillman Rd., Fort Mill, S.C. 29715

[21] Appl. No.: 08/521,094

[22] Filed: Aug. 30, 1995

[51] Int. Cl.$^6$ ............................. F16H 48/06; B60K 1/00
[52] U.S. Cl. ...................... 475/230; 475/220; 180/65.6
[58] Field of Search .................. 74/665 F, 665 G, 74/665 GE, 665 L; 475/5, 151, 207, 210, 220, 230; 180/65.6, 65.7

[56] References Cited

U.S. PATENT DOCUMENTS

| | | | |
|---|---|---|---|
| 675,531 | 6/1901 | Stevens | 180/65.6 |
| 685,321 | 10/1901 | Billings | 475/230 |
| 1,200,873 | 10/1916 | Rosenberger | 475/230 |
| 1,570,941 | 1/1926 | Carroll | 180/65.6 X |
| 2,041,665 | 5/1936 | Paine | 475/5 X |
| 2,395,323 | 2/1946 | Framhein | 180/65.6 |
| 2,497,338 | 2/1950 | Baron | 475/220 X |
| 3,136,379 | 6/1964 | Lauster | 180/65.6 X |
| 4,640,143 | 2/1987 | Schou | 74/650 |
| 5,042,630 | 8/1991 | Hutchison | 475/91 X |
| 5,326,333 | 7/1994 | Niizawa et al. | 475/249 |
| 5,352,164 | 10/1994 | Bensinger et al. | 475/223 |

*Primary Examiner*—Khoi Q. Ta
*Attorney, Agent, or Firm*—Kennedy Covington Lobdell & Hickman, LLP

[57] ABSTRACT

A drive assembly for vehicular use, particularly for use with electric vehicles, includes a primary rotatable housing having an internally mounted hub which is rotatable responsive to rotation of the primary housing with the primary housing being mounted to a vehicular frame. A spider gear assembly is mounted to the hub with a pair of wheel supporting axles mounted at the spider gear assembly in an opposing disposition with each axle being rotatable at independent velocities responsive to rotation of the primary housing.

11 Claims, 2 Drawing Sheets

DRIVE AXLE ASSEMBLY

BACKGROUND OF THE INVENTION

The present invention relates broadly to vehicular drive systems for applying power generated in a vehicular engine or motor to the ground for vehicle propulsion. More particularly, the present invention relates to a drive axle assembly for vehicular use, particularly with electric vehicles, which provides differential operation while being externally driven.

Many automobiles are considered "rear-wheel drive" in that the rear wheels propel the vehicle along a roadway. Power is typically transmitted to the rear wheels through a differential mechanism which allows the driving wheels to rotate at independent velocities. This is a requirement for smooth operation during directional changes which creates an inside wheel or tire and an outside wheel or tire. While it is understood that tires provide the frictional contact for vehicle propulsion, in the interest of clarity and simplicity, reference will be made to wheels in the present application which should be understood to mean the wheel/tire assembly unless otherwise designated. When rounding a corner the outside wheel must cover a greater distance than the inside wheel and, if the wheels are not allowed to independently rotate at different velocities, the result is tire scrub resulting in increased wear on the tires and other drive train components, and less than ideal handling.

Typically, gasoline powered vehicles use a mechanical geared transmission connected to a rotatable drive shaft which are used for power transmission from the motor or engine to the wheels. In a rear-drive vehicle, the engine crank shaft typically rotates about an axis along the longitudinal direction of the vehicle, that is extending in the direction of travel. Likewise, the drive shaft rotates in a similar axis which may be vertically offset from the crank shaft. On the other hand, the wheels are intended to rotate about an axis transverse to the direction of travel.

Accordingly, the power must be transferred from rotation about a longitudinal axis to rotation about a transverse axis. The so-called "rear end" of the vehicle accomplishes this. Typically, the wheels are supported on axles which extend inwardly toward a centerline of the vehicle and intersect at the termination of the drive shaft. It would be possible to use bevel gears to transfer the power 90° for application to the wheels. However, mere beveled gears would result in the aforesaid tire-scrub problems. Therefore, automotive manufacturers have developed a differential system having a spider gear assembly. Such an assembly typically uses a ring gear, or crown gear, which is driven by the drive shaft with the ring gear being attached to the spider gear assembly. The spider gear assembly, which will be explained in greater detail hereinafter, creates the differential effect and allows both wheel supporting axles to be driven at the same speed when the vehicle is moving in a straight line, but allows the axle opposite the ring gear to turn slower or faster as the vehicle turns.

In electric vehicle applications, power is available from the electric motor's armature which is typically oriented transversely to the direction of vehicle travel. Further, electric motors do not have the torque available from gasoline motors, yet are capable of producing significantly more revolutions per unit time than gasoline motors. Accordingly, electric motors used in vehicles have significantly different power producing characteristics than do gasoline motors. This is evident in the way electric vehicles apply power to their respective drive trains. Often, the vehicle will have an electric motor driving each wheel independently. This allows each wheel to rotate at its own velocity regardless of the direction of travel of each wheel. Further, electric motors have inherent magnetic coupling which can absorb small variations in speed between different motors at different wheels.

In some applications, it may become desirable to mount a large electric motor in the rear portion of a vehicle with a belt and pulley system for power transmission. Attachment of a belt and pulley system to a solid axle would not allow the wheels of the vehicle to experience the differential effect and would result in the aforesaid tire scrub. Therefore, it is desirable to provide an apparatus which would allow direct axle drive of an electric vehicle by the electric motor while still providing the ability to turn corners with the drive wheels operating at independent velocities.

SUMMARY OF THE INVENTION

It is accordingly an object of the present invention to provide an apparatus which allows the direct drive of a wheel supporting axle system by an electric motor or other power source which allows driven wheels to operate at independent velocities.

To that end, a drive axle assembly for vehicular use, particularly with electric vehicles, includes a primary rotatable housing having a hub mounted internally thereof and rotatable responsive to rotation of the primary housing, the housing being rotatably mounted to a vehicular frame. The drive axle assembly further includes a spider gear assembly having a spider gear housing with a plurality of spider gears disposed therein with the spider gear housing being mounted to the hub and rotatable therewith responsive to rotation of the primary housing. A pair of wheel supporting axles are mounted to the spider gear assembly in an opposing disposition to extend outwardly therefrom with each axle being rotatable at independent velocities responsive to rotation of the primary housing.

It is preferred that the primary housing include a first, central portion having the hub and spider gear assembly mounted therein for rotation of the hub therewith and a pair of generally cylindrical elongate second housing portions mounted to the first housing portion in an opposing disposition to extend outwardly therefrom and being rotatable therewith with the wheel supporting axles rotatably and telescopically mounted therein. Optionally, the first and second housing portions may be integrally formed. In addition, an arrangement for rotatably driving the primary housing is mounted thereto. The drive arrangement includes at least one pulley mounted to the primary housing for rotation of the housing responsive to driving rotation of the pulley.

The drive arrangement may include a first pulley mounted to one of the second housing portions and a second pulley mounted to the other of the second housing portions with the first pulley being formed with a diameter greater than the diameter of the second pulley with both of said pulleys being selectively drivable by a vehicular propulsion system, the first pulley being for rotation of the primary housing with a first torque value and the second pulley being for rotation of the primary housing with a second torque value with the first torque value being greater than the second torque value. In addition, the primary housing preferably includes a central cylindrical cavity having an inner wall portion with the hub being formed as a disc having an outer perimeter surface with the perimeter surface being fixed to the inner surface of the primary housing for simultaneous rotation therewith.

Preferably, the spider gear assembly is concentrically mounted to the hub.

By the above, the present invention provides a drive axle assembly for use with an electric vehicle which may be externally driven which allows the vehicle drive wheels to rotate at independent velocities.

DETAILED DESCRIPTION OF THE PREFERRED EMBODIMENT

Figure 1:
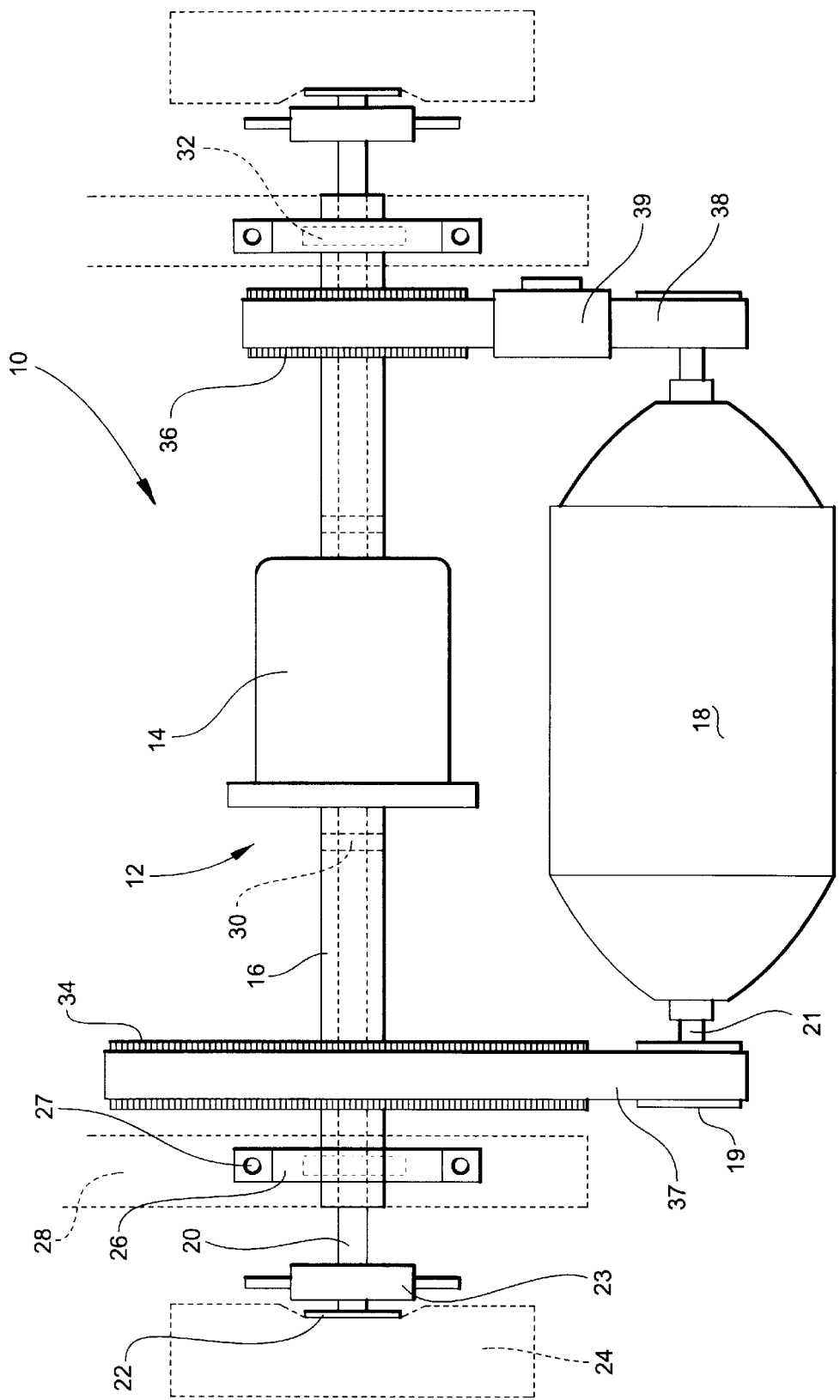
FIG. 1 is a top plan view of a drive axle assembly according to the preferred embodiment of the present invention.

Turning now to the drawings and, more particularly, to FIG. 1, a drive axle assembly according to the preferred embodiment of the present invention is generally illustrated at 10 and includes a primary housing 12 including a generally cylindrical, hollow central housing portion 14 having generally elongate, hollow, cylindrical second housing portions 16 projecting outwardly from either side thereof. The second housing portions 16 may be integrally formed with the first housing portion 14 or they may be mounted thereto using welding or other conventional mounting techniques. A generally elongate shaft-like axle 20 is telescopically mounted within each second housing portion 16 to extend inwardly into the central housing portion 14. Each axle 20 is supported internally within the primary housing 12 by inner bearings 30 disposed within the second housing 16 adjacent the central housing 14. Additionally, outer bearings (not shown) are mounted within the second housing portion 16 adjacent an outer end thereof. Conventional wheel hubs 22 are mounted at the outermost ends of the axles 20. A disc brake assembly 23 may be mounted intermediate the wheel hub 22 and the second housing portion 16. A tire and wheel assembly 24 is typically mounted to the wheel hubs 22. The entire assembly 10 is configured for mounting to a vehicular frame 28 using brackets 26 and bolts 27. Since the primary housing 12 must rotate with respect to the vehicular frame 28, bearings 32 are provided intermediate the second housing portion 16 and the mounting brackets 26.

Since the drive axle assembly of the present invention is primarily for use with an electric motor, FIG. 1 illustrates an electric motor 18 and a typical and preferred driving connection. The electric motor 18 is carried within the vehicle frame and includes an armature shaft 21 projecting from either side of the motor 18. A pinion 19 is disposed on each armature shaft. A pulley 34 is formed as a toothed wheel member and is mounted to a second housing portion 16 at a predetermined location. A second, smaller pulley 36 is formed similarly to the larger pulley yet with a smaller diameter and is mounted to the other second housing portion 16 at a mirror position with respect to the other, large pulley 34. Toothed belts 37,38 extend from each pinion 19 to enrage the toothed pulleys 34,36 for driving movement. Since the belt 38 attendant to the smaller pulley 36 includes a non-supported length of belt, a belt tensioner 39 is provided to maintain belt tension during operation. As will be seen in greater detail hereinafter, driving rotation of the pulleys 34,36 results in rotation of the primary housing 12 which ultimately results in rotation of the wheels 24.

Figure 2:
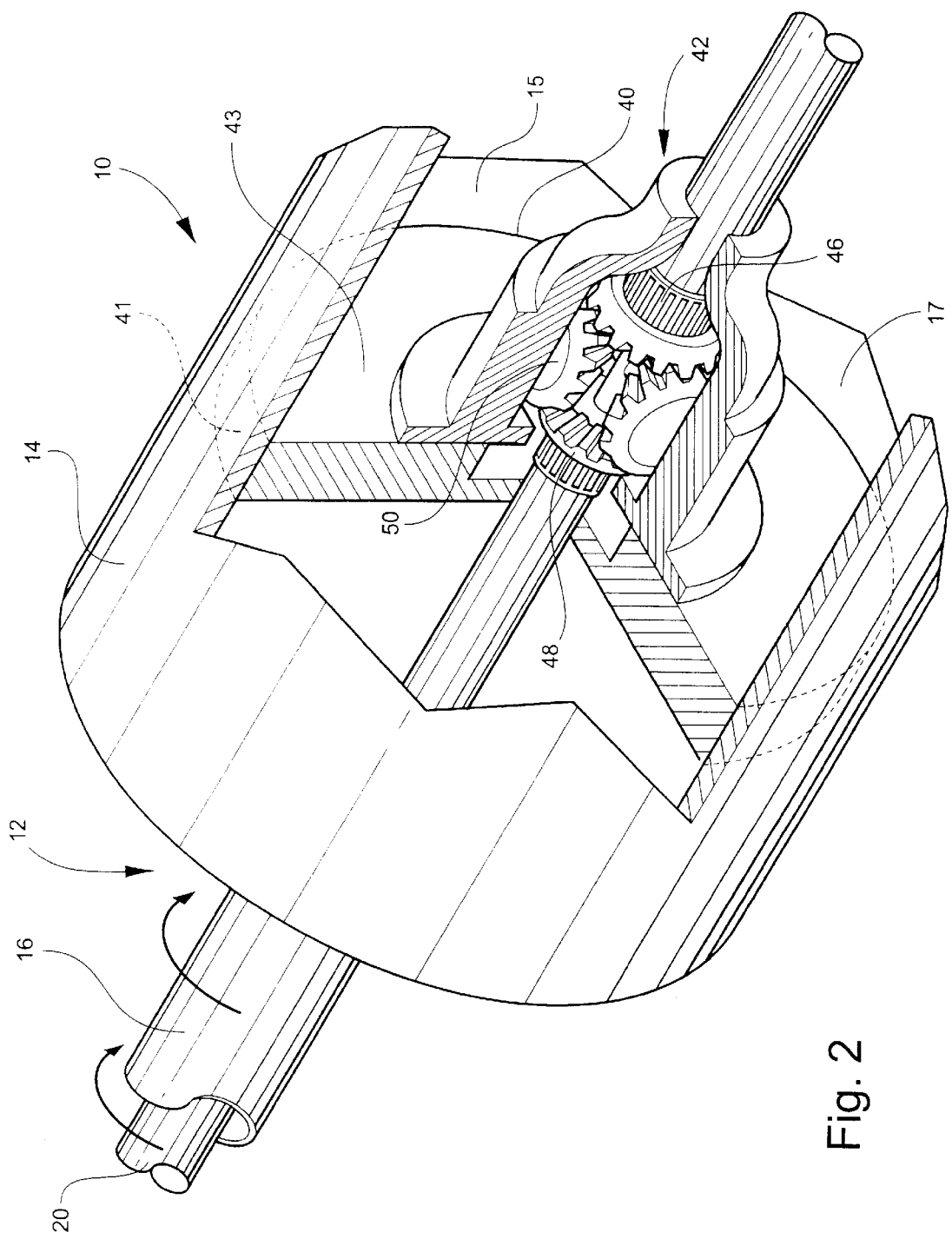
FIG. 2 is a perspective view of a central portion of the drive axle assembly with the primary housing broken open to illustrate the internal structure thereof

Turning now to FIG. 2, the internal components of the drive axle assembly 10 are illustrated. The central housing portion 14 is formed as a generally cylindrical hollow member with a central cavity 17 formed therein and having the differential components contained within the cavity 17. The cavity 17 is defined by a generally cylindrical inner wall portion 15. A hub 40 is provided and is formed as a generally flat disc having a predetermined thickness defining an outer perimeter surface 41 and a generally flat face surface 43. The hub 40 is mounted within the central housing 14 with the perimeter surface 41 in continuous abutting contact with the inner surface 15 of the central housing 14. The hub 40 is attached thereto by any expedient method, such as welding or, if proper balancing can be achieved, by bolting.

A spider gear assembly 42 which is formed as a conventional spider gear assembly, includes a spider gear housing 44 formed as a generally hollow cylindrical member with a tapered end portion. The spider gear housing is mounted to the hub 40 for rotation therewith and, for balancing, is concentrically aligned with the hub 40. Within the spider gear housing 44, an assembly of four small beveled gears, including two pinion gears 48 and two star gears 50, are disposed within the spider gear housing 44 to turn therewith. Each axle 20 entering the central housing 14 is attached to one of the star gears 48 with a splined connection 46. The assembly drives both axles at the same speed when the vehicle is driven in a straight line, but allows the axle opposite the hub 40 to turn slower or faster as the vehicle turns.

In operation, and with reference to FIGS. 1 and 2, the motor 18 is excited into operation. A gear selector (not shown) is used to select motive output from one end of the motor 18 or the other to connect driving power from the pinion 19 to the selected pulley 34,36 through the respective belt 37,38. This motive power causes driving torque to be applied to the selected pulley 34,36 which in turn causes rotation of the primary housing 12 by simultaneous rotation of both the central housing portion 14 and the second housing portions 16. Since the hub 40 is mated to the inner surface 15 of the central housing 14, the hub 40 is caused to rotate simultaneously with the central housing 14. Accordingly, motive power is transferred to the axles which are caused to rotate and drive the vehicle. The axle 20 mounted to the hub 40 is driven and, through the star and pinion gears 48,50, the opposing axle 20 is driven as well. Both axles 20 are driven at the same speed when the vehicle is driven in a straight line, but, when a corner is turned, the axle opposite the hub 40 turns slower or faster as the vehicle turns and as is necessary.

It will be appreciated by those skilled in the art that the present invention is adaptable to a wide variety ol vehicular uses and should not be considered as limited to an electric vehicle format. The only true requirement is that the drive axle assembly be externally driven.

By the above, the present invention provides a unique drive axle assembly which allows the use of an electric motor and belt drive which also provides a compact configuration for space efficiency.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A drive axle assembly for vehicular use said drive axle assembly comprising:

a primary rotatable housing having a hub mounted internally thereof and rotatable responsive to rotation of said primary housing, said housing being rotatably mountable to a vehicular frame, and a first central portion having said hub mounted therein for rotation of said hub therewith and;

a spider gear assembly mounted in said first central portion and having a spider gear housing with a plurality of spider gears disposed therein, said spider gear housing being mounted to said hub and rotatable therewith responsive to rotation of said primary housing;

a pair of generally cylindrical elongate second housing portions mounted to said first central housing portion in an opposing disposition to extend outwardly therefrom and being rotatable therewith; and a pair of wheel supporting axles mounted to said spider gear assembly in an opposing disposition to extend outwardly therefrom, said wheel supporting axles being rotatable and telescopically mounted in said second housing portions, each said axle being rotatable at independent velocities responsive to rotation of said primary housing.

2. A drive axle assembly according to claim 1 and further comprising means for rotatably driving said primary housing mounted thereto.

3. A drive axle assembly according to claim 2 wherein said drive means includes at least one pulley mounted to said primary housing for rotation of said housing responsive to driving rotation of said pulley.

4. A drive axle assembly according to claim 2 wherein said drive means includes a first pulley mounted to one of said second housing portions and a second pulley mounted to the other of said second housing portions, with said first pulley being formed with a diameter greater than the diameter of said second pulley with both of said pulleys being selectively drivable by a vehicular propulsion system, said first pulley being for rotation of said primary housing with a first torque value and said second pulley being for rotation of said primary housing with a second torque value, said first torque value being greater than said second torque value.

5. A drive axle assembly according to claim 1 wherein said primary housing includes a first central portion having said hub and said spider gear assembly mounted therein for rotation of said hub therewith and a pair of generally cylindrical elongate second housing portions integrally formed with said first housing portion to extend outwardly therefrom in an opposing disposition and being rotatable therewith with said wheel supporting axles rotatably and telescopically mounted therein.

6. A drive axle assembly according to claim 1 wherein said primary housing includes a central cylindrical cavity having an inner wall portion and said hub is formed as a disc having an outer perimeter surface, said perimeter surface being fixed to said inner surface of said primary housing for simultaneous rotation therewith.

7. A drive axle assembly according to claim 6 wherein said spider gear assembly is concentrically mounted to said hub.

8. A drive axle assembly for vehicular use, said drive axle assembly comprising:

a primary rotatable housing having a hub mounted internally thereof and rotatable responsive to rotation of said primary housing, said primary housing including a first central portion having said hub mounted therein for rotation of said hub therewith and a pair of generally cylindrical elongate second housing portions associated with said first housing portion to extend outwardly therefrom in an opposing disposition and being rotatable therewith with a pair of wheel supporting axles rotatably and telescopically mounted therein, said housing being rotatably mountable to a vehicular frame;

a spider gear assembly having a spider gear housing with a plurality of spider gears disposed therein, said spider gear housing being mounted to said hub and rotatable therewith responsive to rotation of said primary housing; and said wheel supporting axles mounted to said spider gear assembly in an opposing disposition to extend outwardly therefrom, each said axle being rotatable at independent velocities responsive to rotation of said primary housing.

9. A drive axle assembly according to claim 8 and further comprising means for rotatably driving said primary housing, said drive means including a first pulley mounted to one of said second housing portions and a second pulley mounted to the other of said second housing portions, with said first pulley being formed with a diameter greater than the diameter of said second pulley with both of said pulleys being selectively drivable by a vehicular propulsion system, said first pulley being for rotation of said primary housing with a first torque value and said second pulley being for rotation of said primary housing with a second torque value, said first torque value being greater than said second torque value.

10. A drive axle assembly according to claim 8 wherein said primary housing includes a central cylindrical cavity having an inner wall portion and said hub is formed as a disc having an outer perimeter surface, said perimeter surface being fixed to said inner surface of said primary housing for simultaneous rotation therewith.

11. A drive axle assembly according to claim 10 wherein said spider gear assembly is concentrically mounted to said hub.

\* \* \* \* \*